US006797658B2

(12) United States Patent
Pecoraro et al.

(10) Patent No.: US 6,797,658 B2
(45) Date of Patent: Sep. 28, 2004

(54) METHODS OF ADJUSTING TEMPERATURES OF GLASS CHARACTERISTICS AND GLASS ARTICLES PRODUCED THEREBY

(75) Inventors: George A. Pecoraro, Lower Burrell, PA (US); Jerry C. Ratliff, Arnold, PA (US); Richard Markovic, Lower Burrell, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/974,124

(22) Filed: Oct. 8, 2001

(65) Prior Publication Data

US 2003/0054938 A1 Mar. 20, 2003

Related U.S. Application Data

(63) Continuation-in-part of application No. 09/780,887, filed on Feb. 9, 2001.

(51) Int. Cl.[7] .............................................. C03C 3/087
(52) U.S. Cl. .......................................... 501/70; 501/71
(58) Field of Search ............................. 501/27, 53, 54, 501/68, 69, 70, 71, 72

(56) References Cited

U.S. PATENT DOCUMENTS

| | | | | |
|---|---|---|---|---|
| 5,004,706 A | * | 4/1991 | Dickinson ..................... | 501/27 |
| 5,030,594 A | | 7/1991 | Heithoff ........................ | 501/72 |
| 5,071,796 A | | 12/1991 | Jones et al. ................... | 501/70 |
| 5,344,798 A | * | 9/1994 | Morimoto et al. ............. | 501/70 |
| 5,352,640 A | | 10/1994 | Combes et al. ................ | 501/71 |
| 5,362,689 A | * | 11/1994 | Morimoto et al. ............. | 501/70 |
| 5,364,820 A | * | 11/1994 | Morimoto et al. ............. | 501/69 |
| 5,380,685 A | * | 1/1995 | Morimoto et al. ............. | 501/70 |
| 5,545,596 A | | 8/1996 | Alvarez Casariego et al. ............................. | 501/71 |
| 5,688,727 A | | 11/1997 | Shelestak et al. .............. | 501/71 |
| 5,700,579 A | * | 12/1997 | Jeanvoine et al. ............ | 428/426 |
| 5,780,372 A | | 7/1998 | Higby ........................... | 501/70 |
| 5,807,417 A | | 9/1998 | Boulos et al. ............... | 65/134.3 |
| 5,837,629 A | | 11/1998 | Combes et al. ................ | 501/70 |
| 6,313,052 B1 | * | 11/2001 | Nakashima et al. ........... | 501/69 |

FOREIGN PATENT DOCUMENTS

| | | |
|---|---|---|
| EP | 0 555 552 | 8/1993 |
| EP | 0 653 385 | 5/1995 |
| EP | 0 803 479 | 10/1997 |
| EP | 0 849 233 | 6/1998 |
| EP | 0 952 123 | 10/1999 |
| EP | 1118597 | 7/2001 |
| JP | 8-217485 | 8/1996 |
| JP | 8-217486 | 8/1996 |
| WO | 99/01391 | 1/1999 |
| WO | 02/16277 | 2/2002 |

OTHER PUBLICATIONS

International Search Report mailed May 7, 2003.

* cited by examiner

*Primary Examiner*—David Sample
*Assistant Examiner*—Elizabeth Bolden
(74) *Attorney, Agent, or Firm*—Jacques B. Miles

(57) ABSTRACT

A method is provided for adjusting, e.g., lowering, the melting and/or forming and/or liquidus temperatures of a glass composition which can be accomplished without substantially changing the bending and annealing temperatures of the glass composition. The method includes decreasing the amount of MgO in the glass composition and increasing the amount of two or more or all of CaO, $R_2O$ ($Na_2O$ and $K_2O$), $Al_2O_3$ and $SiO_2$ by the same or about the same amount.

13 Claims, 3 Drawing Sheets

METHODS OF ADJUSTING TEMPERATURES OF GLASS CHARACTERISTICS AND GLASS ARTICLES PRODUCED THEREBY

This application is a continuation in part patent application of U.S. patent Ser. No. 09/780887 filed Feb. 9, 2001 entitled "METHODS OF ADJUSTING GLASS MELTING AND FORMING TEMPERATURES WITHOUT SUBSTANTIALLY CHANGING BENDING AND ANNEALING TEMPERATURES AND GLASS ARTICLES PRODUCED THEREBY" which is hereby incorporated by reference.

BACKGROUND OF THE INVENTION

1. Field of the Invention

This invention relates generally to glass compositions having improved melting and refining characteristics and, more particularly, to methods of adjusting a glass composition to lower the temperature (s) of the melting and/or of forming viscosities and/or of devitrification preferably without substantially changing the temperature (s) of the bending and/or annealing viscosities of the glass, if so desired. The invention also relates to glass articles made from the glass compositions.

2. Technical Considerations

Glass manufacturers melt glass batch materials and refine the molten glass to form glass articles. For example, in a conventional float glass process, glass batch materials are heated in a furnace or melter to form a glass melt. The glass melt is poured onto a bath of molten tin, where the glass melt is formed and continuously cooled to form a float glass ribbon. The float glass ribbon is cooled and cut to form solid glass articles, such as flat glass sheets. The particular batch materials used and their relative amounts are selected based on the desired properties of the glass articles. Exemplary glass batch compositions are disclosed in U.S. Pat. Nos. 5,071,796; 5,837,629; 5,688,727; 5,545,596; 5,780,372; 5,352,640; and 5,807,417, just to name a few.

As will be appreciated by one of ordinary skill in the glass manufacturing art, glass composition properties can be defined based on their temperature and viscosity characteristics. For example, the "melting temperature" of a glass is conventionally defined as the temperature at which the glass has a viscosity of 100 poises, which is conventionally referred to as the temperature of the "log 2" viscosity (i.e., the logarithm of the viscosity of the glass in poises is 2). Similarly, the "forming temperature" (log 4 viscosity), "bending temperature" (log 7.6 viscosity), "annealing temperature (log 13 viscosity), and "strain point" (log 14.5 viscosity), are conventionally defined as the temperatures at which the logarithms of the glass viscosity in poises are 4, 7.6, 13, and 14.5, respectively. The "liquidus temperature" is that temperature at which the glass begins to devitrify, which can cause undesirable haziness in the glass product. The difference between the forming temperature and the liquidus temperature is known as the "working range". It is generally desirable to have a working range spanning more if than 40° F. (22° C.).

Glass fabricators purchase flat glass sheets from glass manufacturers and process these glass sheets into various commercial products, such as architectural windows, mirrors, shower doors, automotive windows, insulating glass units, etc. Typically, this processing includes heating the flat glass sheets to bend the sheets and then controllably cool the sheets to anneal, temper, or heat strengthen the sheets. The bending, tempering and/or annealing temperatures for a particular type of glass are important economic factors in the fabrication process and cannot be easily changed without substantially altering the existing fabrication process, which would be expensive and time consuming.

Due to increased tonnage and quality demand for flat glass products, flat glass manufacturers are under pressure to increase their glass production while reducing the cost of manufacturing the glass. Many glass manufacturers are operating their glass furnaces at higher and higher throughput and temperatures to meet the increased demand for glass. However, this need to increase glass production has resulted in several problem areas. For example, the operating temperature of a conventional flat glass furnace is typically on the order of 2850° F. (1564° C.). As more glass batch material is processed through the furnace, more fuel is required to melt the increased amounts of glass batch materials in a shorter time period. This increased fuel usage adds significantly to the production cost of the glass sheets or articles and results in a decreased thermal efficiency for the melting operation. Further, running the melter at increased throughput and at elevated temperatures can also damage the melter refractories, such as by causing thermal and/or chemical damage to the silica crowns and breast walls, which can lead to premature failure or collapse of the melter superstructure and solid defects in the glass.

The forming temperature of glass made by the float glass process is maintained sufficiently high to avoid devitrification of the glass, thereby resulting in crystalline defects in the float glass product. With some glass compositions such higher forming temperatures can be problematic with an increase in the dissolution rate of sections of the float glass melter including sections which deliver the molten glass to the molten tin bath. For instance the service life of forming refractories of the melter could be decreased.

Therefore, it would be advantageous to provide glass manufacturers with a method of adjusting a glass composition (and thus the batch materials from which it is made) to provide a lower melting point and/or lower temperatures of forming and/or lower liquidus temperature. The former assists in decreasing fuel usage and potential damage to the melter while maintaining substantially the same bending and annealing temperatures as the starting glass composition. The latter can extend the service life of sections of the melter including the forming refractories.

SUMMARY OF THE INVENTION

The present invention provides a method of adjusting, e.g., lowering, the melting and/or forming temperatures and/or liquidus temperature of a glass composition. Such adjustments can avoid substantial changes to the bending and/or annealing temperatures of the glass. In one aspect of the invention directed to glass compositions containing calcium oxide (CaO) and magnesium oxide (MgO), it has been discovered that increasing the amount, e.g., weight percent, of CaO and decreasing the MgO by substantially the same amount (weight percent) results in glass having lowered melting and forming temperatures without substantially changing the bending and annealing temperatures of the glass. Also it has been discovered that decreasing the amount of MgO in the glass and increasing the amount of at least two or more of CaO, $R_2O$ ($Na_2O$ and $K_2O$), $Al_2O_3$ and/or $SiO_2$ reduces the liquidus temperature. The reduction and concomitant increase in amounts of these materials is performed without adversely impacting the corrosiveness of the glass melt. Additionally depending on which temperature of the melting, softening, and/or liquidus temperature is to be impacted the concomitant increase in the amounts of which of the two or more of the aforementioned materials can be effected. For instance the alteration of the softening point of the glass can be effected to match glass compositions from different melters to achieve a common softening point for any subsequent bending and annealing operations. In this instance the amounts of CaO and $R_2O$ and/or $Al_2O_3$ and/or $SiO_2$ can be increased so that the total of the increase across two or more of these materials equals the decrease in the amount of MgO.

In another aspect of the invention, a method of lowering the melting and forming temperatures of a glass composition includes replacing at least some of the CaO and/or MgO of the glass composition with a metal oxide whose metal ion has a lower field strength than $Ca^{++}$ and/or $Mg^{++}$, e.g., $Ba^{++}$ or $Sr^{++}$.

A glass composition having advantageous properties for flat glass manufacture is also provided. In one embodiment, the glass composition has a melting temperature in the range of about 2570° F. to about 2590° F. (1410° C. to about 1421° C.) and a forming temperature in the range of about 1850° F. to about 1894° F. (1010° C. to about 1034° C.). The glass composition has a bending temperature in the range of about 1300° F. to about 1350° F. (704° C. to about 732° C.) and an annealing temperature in the range of about 1016° F. to 1020° F. (547° C. to 549° C.).

In another aspect of the invention the glass composition has a reduced liquidus temperature without increasing the alkali components to make the composition too corrosive. In such an aspect the glass composition has a melting temperature in the range of about 2510° F. to about 2650° F. (1376° C. to about 1454° C.) and a forming temperature in the range of about 1800° F. to about 1894° F. (982° C. to about 1034° C.) and a liquidus temperature in the range of about 1780° F. to about 1850° F. (971° C. to 1010° C.). The glass composition can have a bending temperature in the range of about 1300° F. to about 1350° F. (704° C. to about 732° C.) and an annealing temperature in the range of about 1016° F. to 1020° F. (547° C. to 549° C.). In such a glass composition the MgO amount is in the range of about 1 to about 3 weight percent for higher iron containing glasses and of about 0.01 to 0.15 weight percent for lower iron containing glasses. The higher iron containing glasses have an iron content of at least 0.1 and the lower iron containing glasses has an iron content of less than 0.1 weight percent. The $CaO+R_2O+Al_2O_3$ combined amount can make up for the reduction in MgO when the combined amount is in the range of about 23 to about 29 weight percent.

DESCRIPTION OF THE INVENTION

Figure 1:
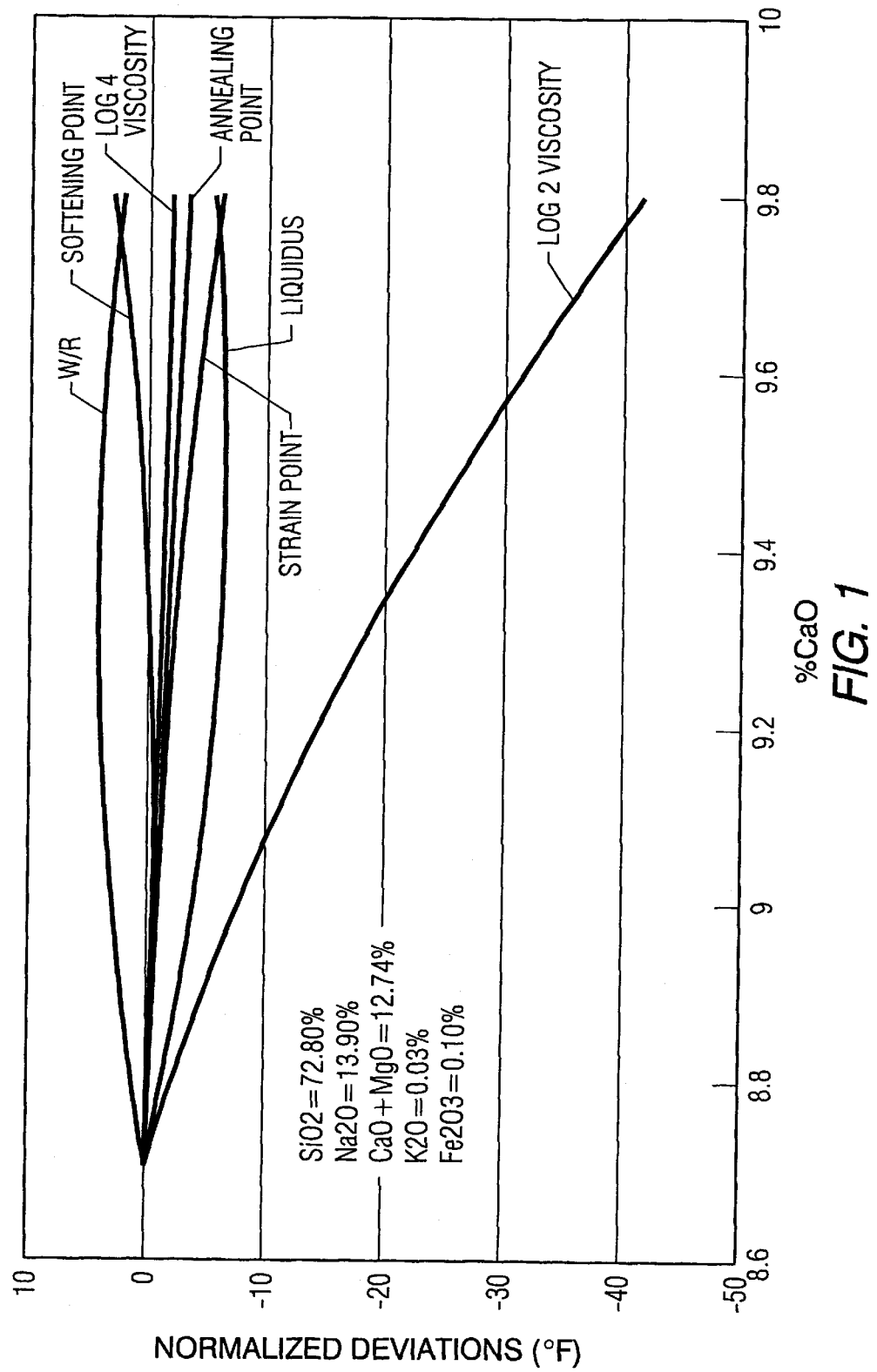
FIG. 1 is a graph of the normalized deviation of selected parameters versus weight percent CaO for an exemplary (computer modeled) glass composition of the invention.

As used herein, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, any numeric reference to amounts, unless otherwise specified, is "by weight percent" based on the total weight of the glass composition. The total iron content of the glass compositions disclosed herein is expressed in terms of $Fe_2O_3$ in accordance with standard analytical practice, regardless of the form actually present. As used herein, the terms "solar control" and "solar control properties" mean properties which affect the solar properties, e.g., visible, IR, or UV transmittance and/or reflectance, of the glass.

The present invention provides a method of adjusting a glass composition to change, e.g., lower, the melting and/or forming and/or liquidus temperatures of the glass composition which can be accomplished without substantially changing the bending and/or annealing temperatures of the glass. Alternatively the bending and/or annealing temperatures of particular glass compositions can be altered to match such temperatures for a wider range of glass compositions. The invention also can provide glass compositions having improved melting and forming characteristics which are particularly well suited for a float glass process. An exemplary method of practicing the invention for adjusting specific aforementioned temperatures will first be discussed and then exemplary glass compositions of the invention will be discussed.

Although the present invention can be practiced with any type of glass, the invention is particularly well suited for flat glass compositions, such as soda-lime-silica glass compositions, having silica as the major constituent along with other melting and refining aids. A basic soda-lime-silica glass composition is formed from a batch having silica (sand), soda ash (a carbonate of soda), dolomite (a carbonate of calcium and magnesium), limestone (a carbonate of calcium), and oxidizing agents, such as nitrate or sulfate. The limestone and dolomite act as fluxes to aid in dissolution of the silica and to improve the durability of the glass product. As will be appreciated by one skilled in the art, the relative amounts of the batch components depend upon the desired composition of the glass to be made.

Cullet may be added to the batch materials either before feeding the batch materials into the melter or during melting. The cullet may be clear glass or may include conventional coloring agents. The cullet may also include iron in either the ferrous or ferric states, although the ferrous state is desired for most solar control glass products.

Additional materials may also be added to the batch which affect the final properties of the glass, e.g., solar properties such as infrared (IR) or ultraviolet (UV) transmittance, reflectance, or optical properties, aesthetic properties, and the like. Such materials include elements or compounds of titanium, selenium, cobalt, cerium, vanadium, molybdenum, chromium, nickel, manganese, copper and combinations of any of these. Generally, as the amounts of these types of materials increase, the visible, IR and UV transmittance of the resultant glass decrease. Additionally some of these materials may function as colorants for glass, and other colorants known in the flat and/or float glass industry may be added.

The glass compositions of the invention may include small amounts of other materials, for example melting and refining aids, tramp materials or impurities, such as elements or compounds of sodium, potassium, calcium, magnesium, manganese, aluminum, sulfur, strontium, zirconium, chlorine, cobalt, nickel, selenium, chromium, molybdenum, barium, titanium, cerium, tin, zinc or iron.

It should be appreciated that as a result of forming the glass on molten tin in the float process as discussed above, measurable amounts of tin oxide may migrate into surface portions of the glass on the side contacting the molten tin. Typically, a piece of float glass even though tin compounds have not intentionally been added to the batch materials to form the glass can have a $SnO_2$ concentration. This concentration can be from 0.05 to 2 wt % in the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the glass properties is minimal.

In the practice of the invention, it has been found that for a glass composition, particularly a soda-lime-silica flat glass composition, increasing the CaO in the glass composition by a selected amount (weight percent) while decreasing the MgO by the same selected amount (i.e. the same weight percent change as the CaO) or substantially the same amount (e.g., up to ±5 weight percent, e.g., ±5 weight percent or less, e.g., ±4 weight percent or less, e.g., ±3 weight percent or less, e.g., ±1 weight percent or less, preferably ± less than 1 weight percent of the selected amount) while maintaining a substantially constant total amount of CaO+MgO (e.g., maintaining the total amount within ±5 weight percent of the starting total amount, e.g., within ±3 weight percent, e.g., within ±1 weight percent, preferably within ± less than 1 weight percent) decreases the melting and forming temperatures of the glass without substantially changing the bending and annealing temperatures of the glass. It is believed without limiting the invention that this result is based at least partly on the fact that the atomic field strength (conventionally designated $z/a^2$ where "z" is the ion charge and "a" is the internuclear distance between the cation and anion) for the calcium ion (0.33) is less than the field strength of the magnesium ion (0.45). This lower calcium ion field strength is believed to result in lower calcium covalent bond strength as compared to magnesium covalent bond strength, thus requiring less shear force to break the calcium covalent bonds which results in lower glass viscosity in the melting and forming temperature range.

In one particular embodiment of the invention, it has been discovered that increasing the relative amount (weight percent based on total weight of the glass composition) of CaO with respect to MgO in the glass composition while maintaining a total amount (weight percent based on total weight of the glass composition) of CaO+MgO in the range of 12 to 15 weight percent, e.g., 12.1 to 15 weight percent, e.g., 12.5 to 13.0 weight percent, e.g., 12.8 to 12.9 weight percent, results in glass having lower melting and forming temperatures than before this adjustment, without substantially changing the bending and annealing temperatures of the glass. As used herein, the phrases "without substantially changing the bending and annealing temperatures" or "substantially maintaining the bending and annealing temperatures" mean that the bending and annealing temperatures of the glass preferably do not change more than about 1° F. to about 10° F. (0.5° C. to 5° C.), preferably not more than about 2° F. to about 5° F. (1° C. to 3° C.), more preferably less than about 5° F. (3° C.), still more preferably not more than about 4° F. (2.5° C.), even more preferably less than about 3° F. (2° C.), and most preferably less than about 2° F. (10° C.).

In Examples 1–5 presented below, various exemplary glass compositions are modeled to show the affect of varying the weight percent of CaO and MgO in accordance with the practice of the invention while maintaining the other glass components substantially unchanged. As will be appreciated by one skilled in the art, in order to form these glass compositions, the batch components, e.g., limestone and dolomite, are adjusted to yield a desired glass composition.

Based on this new understanding of glass behavior, glass articles can be made having relatively higher CaO and lower MgO amounts (weight percents) than previously practiced without adversely affecting the fabrication parameters, e.g., bending and/or annealing temperatures, of the glass.

An exemplary glass composition incorporating features of the invention is characterized as follows:

TABLE 1

| Component | Weight Percent |
|---|---|
| $SiO_2$ | 70–75 |
| $Na_2O$ | 12–15 |
| $K_2O$ | 0–2 |
| CaO | >9 |
| MgO | <4 |
| $Al_2O_3$ | 0–2 |
| $SO_3$ | 0–1 |
| $Fe_2O_3$ | 0–2 |
| $SiO_2 + Al_2O_3$ | ≧70 |
| $Na_2O + K_2O$ | 12–15 |
| CaO + MgO | 12–13.5 |
| CaO/MgO | 2–5 |

As will be appreciated by one skilled in the art, other conventional components or ingredients such as colorants, solar control materials, tramp materials, etc. as discussed above may also be present in the glass.

In the above exemplary composition, the CaO is preferably greater than 9 weight percent and the MgO is preferably less than 4 weight percent based on the total weight of the composition. For example, the CaO can be greater than or equal to 10 weight percent, e.g., 10 to 10.5 weight percent, e.g., 10.25±0.25 weight percent. The MgO can be less than or equal to 3 weight percent, e.g., 2 to 3 weight percent, e.g., 2.5±0.5 weight percent. The total weight percent of CaO+MgO is preferably about 12.8 to 12.9, e.g., 12.85±0.05. Additional exemplary glass compositions include:

TABLE 2

| Component | Composition 1 | Composition 2 |
|---|---|---|
| $SiO_2$ | 72.53 | 72.89 |
| $Na_2O$ | 13.79 | 13.9 |
| $K_2O$ | 0.02 | 0 |
| CaO | ≧9.1 | ≧10 |
| MgO | ≦4 | ≦3 |
| $Al_2O_3$ | 0.03 | 0.03 |
| $SO_3$ | 0.2 | 0.2 |
| $Fe_2O_3$ | 0.5 | 0.1 |
| $SiO_2 + Al_2O_3$ | 72.56 | 72.91–73.01 |
| $Na_2O + K_2O$ | 13.81 | 13.9 |
| CaO + MgO | 12.85 | 12.69–12.8 |

The additional exemplary glass compositions immediately above preferably provide a melting temperature of less than 2600° F. (1425° C.), e.g., 2500° F. to 2600° F. (1370° C. to 1425° C.), e.g., 2570° F. to 2590° F. (1410° C. to 1421° C.), and a forming temperature less than about 1900° F. (1037° C.), e.g., 1800° F. to 1900° F. (981° C. to 1037° C.), e.g., 1850° F. to 1894° F. (1010° C. to 1034° C.). The glass preferably has a bending temperature of less than about 1400° F. (759° C.), e.g., 1300° F. to 1400° F. (704° C. to 759° C.), e.g., 1300° F. to 1350° F. (704° C. to 732° C.), and an annealing temperature of less than about 1050° F. (565°

C.), e.g., 1010° F. to 1050° F. (543° C. to 565° C.), e.g., 1016° F. to 1020° F. (547° C. to 549° C.).

In another particular embodiment of the invention, it has been discovered that increasing the relative amount (weight percent based on total weight of the glass composition) of one or more including all of: CaO, $R_2O$ ($Na_2O$ and/or $K_2O$), $SiO_2$ and/or $Al_2O_3$ while reducing the amount of MgO in the glass composition lowers liquidus temperature without deleterious effects on corrosiveness of the glass melt. Concomitantly the total amounts (weight percent based on total weight of the glass composition) of the following components are maintained in the following ranges:

TABLE 3

| Components | Weight Percent |
| --- | --- |
| $SiO_2$ | 70–75 |
| $Na_2O$ | 12–17 |
| $K_2O$ | 0–2 |
| CaO | 9–12 |
| MgO | <3 |
| $Al_2O_3$ | 0.001–4 |
| $SO_3$ | 0–1 |
| $Fe_2O_3$ | 0–2 |
| $SiO_2 + Al_2O_3$ | ≧70 |
| $Na_2O + K_2O$ | 12–17 |
| CaO + MgO | 9–14 |
| CaO + $R_2O$ + $Al_2O_3$ | 23–29 preferably 24–28) |

As with the glass composition of table 1, other conventional components or ingredients such as colorants, solar control materials, tramp materials, etc. as discussed above may also be present in the glass composition of Table 3. The amount of MgO is generally less than 3 weight percent but is even lower for the low iron containing glasses like those of U.S. Pat. No. 5,030,594 hereby incorporated by reference. In the low iron glasses the amount of MgO can be in the range of 0.01 to 0.15 weight percent. For these glass compositions the liquidus temperature preferably is in the range of 1790° F. to 1820° F. (976° C. to 994° C.). In the higher iron containing glasses with iron in any form, ferric and/or ferrous, and in an amount at least 0.1 weight percent, the MgO ranges from 1 to 3 weight percent.

Glass compositions with the amounts of these components result in glass having lower liquidus temperature of preferably a reduction of 20° F. (~11° C.) and most preferably of 30° F. (~17° C.). This can be accomplished while maintaining adequate melting and forming temperatures all other than before this adjustment. Also this adjustment can be performed without substantially changing the bending and annealing temperatures of the glass, if desired. For this latter adjustment the increased amount of material is substantially CaO. Here "substantially" refers to that amount of CaO so as not to substantially change the bending and annealing temperatures of the glass. The melting, forming, and liquidus temperatures for glass compositions from Table 3 can be in the ranges shown in Table 4:

TABLE 4

| Glass Property | ° F. (° C.) | Preferred ° F. (° C.) |
| --- | --- | --- |
| Melting temperature | 2510–2650 (1376–1454) | 2520–2640 (1382–1449) |
| Forming temperature | 1800–1894 (982–1034) | 1805–1884 (985–1029) |
| Liquidus temperature | 1780–1850 (971–1010) | 1789–1845 (976–1007) |

While the above exemplary glass compositions are presented to describe the general concept of the invention, it is to be understood that the invention is not limited to these specific exemplary embodiments.

As will be appreciated from the above discussion and the following Examples, the glass compositions of the invention provide improved melting and refining characteristics while maintaining substantially the same fabricating characteristics. For example, the decreased melting temperatures provided by the glass compositions of the invention mean less fuel is required to initially melt the glass batch components. Additionally, the resultant glass article formed in accordance with the glass compositions of the invention also has a lower melting point than would occur without the practice of the invention. This means that when a glass article of the invention is used as cullet in the glass melter, less fuel is required to melt the cullet which further reduces the fuel requirements. Moreover, the glass article may be used by glass fabricators using their existing bending and annealing apparatus and methods without the need for the fabricators to change the fabricating parameters, e.g., bending and annealing temperatures, used to fabricate a commercial glass product. Further, limestone (CaO source) is typically less expensive than dolomite (CaO and MgO source). Therefore, increasing the amount of CaO and decreasing the amount of MgO in the glass composition means that more limestone and less dolomite are needed in the batch, which reduces the cost of the glass batch.

In a further aspect of the invention, in addition to changing the relative amounts of the CaO and MgO in a glass composition as described above, one or more components of the glass, such as CaO and/or MgO, can be replaced totally or in part by a material having a lower field strength. For example, the CaO and/or MgO can be replaced in whole or in part by a material, such as an oxide, containing $Ba^{++}$ or $Sr^{++}$, which have a lower field strength than $Ca^{++}$ or $Mg^{30+}$.

The following examples are presented to demonstrate the principles of the invention. However, the invention is not limited to the specific examples presented.

PREDICTIVE EXAMPLE 1

A database of flat glass compositions and their respective temperature related properties was developed. The database was primarily based on commercial flat glass compositions made by the float glass process. This database was then statistically modeled using commercially available "Data Desk" and "SAS" statistical programs to develop algorithms for the various glass characteristics, such as melting temperature, forming temperature, bending temperature, annealing temperature, liquidus temperature, and working range. The resulting algorithms were optimized using the "Solver" program which is available in the EXCEL™ menu from Microsoft Corporation.

Table 6 shows the results of this computer modeling for varying the CaO and MgO amounts for a hypothetical glass composition characterized as follows:

TABLE 5

| Component | Weight Percent |
| --- | --- |
| $SiO_2$ | 72.53 ± 0.1 |
| $Na_2O$ | 13.79 ± 0.1 |
| $K_2O$ | 0.02 ± 01 |
| $Al_2O_3$ | 0.03 ± .01 |
| $SO_3$ | 0.2 ± .01 |
| $Fe_2O_3$ | 0.5 ± .01 |
| $SiO_2 + Al_2O_3$ | 72.56 ± 0.1 |
| $Na_2O + K_2O$ | 13.81 ± 0.1 |
| CaO + MgO | 12.85 ± .05 |

TABLE 6

| Wt. % CaO | Wt. % MgO | Melting Temp. | Forming Temp. | Bending Temp. | Annealing Temp. | Working Range (log 4–liquidus) |
|---|---|---|---|---|---|---|
| 9.20 | 3.65 | 2594° F. (1423° C.) | 1868° F. (1020° C.) | 1343° F. (728° C.) | 1022° F. (550° C.) | 62° F. (34° C.) |
| 9.40 | 3.45 | 2589° F. (1421° C.) | 1866° F. (1019° C.) | 1344° F. (729° C.) | 1022° F. (550° C.) | 61° F. (34° C.) |
| 9.50 | 3.35 | 2587° F. (1419° C.) | 1865° F. (1018° C.) | 1344° F. (729° C.) | 1023° F. (551° C.) | 60° F. (33° C.) |
| 9.59 | 3.25 | 2585° F. (1418° C.) | 1865° F. (1018° C.) | 1344° F. (729° C.) | 1023° F. (551° C.) | 60° F. (33° C.) |
| 9.69 | 3.15 | 2584° F. (1418° C.) | 1864° F. (1018° C.) | 1344° F. (729° C.) | 1023° F. (551° C.) | 60° F. (33° C.) |
| 9.79 | 3.05 | 2581° F. (1416° C.) | 1863° F. (1017° C.) | 1344° F. (729° C.) | 1024° F. (551° C.) | 59° F. (33° C.) |
| 9.99 | 2.85 | 2577° F. (1414° C.) | 1861° F. (1016° C.) | 1344° F. (729° C.) | 1025° F. (552° C.) | 56° F. (31° C.) |
| 10.20 | 2.64 | 2573° F. (1412° C.) | 1859° F. (1015° C.) | 1344° (729° C.) | 1026° F. (552° C.) | 53° F. (29° C.) |
| 10.30 | 2.54 | 2571° F. (1411° C.) | 1859° F. (1015° C.) | 1344° F. (729° C.) | 1027° F. (553° C.) | 51° F. (28° C.) |
| 10.40 | 2.44 | 2569° F. (1409° C.) | 1858° F. (1014° C.) | 1344° F. (729° C.) | 1027° F. (553° C.) | 48° F. (27° C.) |
| 10.50 | 2.34 | 2558° F. (1403° C.) | 1857° F. (1014° C.) | 1344° F. (729° C.) | 1028° F. (553° C.) | 46° F. (26° C.) |

As shown in the computer modeling results of Table 6, as the weight percent of CaO in the composition increases from 9.20 to 10.50 (with the total weight percent of CaO+MgO in the composition remaining at 12.84–12.85), the melting temperature of the glass drops from 2594° F. (1423° C.) to 2558° F. (1403° C.) and the forming temperature drops from 1868° F. (1020° C.) to 1857° F. (1014° C.). However, the bending temperature of the glass only changes from 1343° F. (728° C.) to 1344° F. (729° C.) and the annealing temperature of the glass changes from 1022° F. (550° C.) to 1028° F. (553° C.).

As also shown in Table 6, as the weight percent of CaO in the composition increases the working range of the glass composition narrows. In order to prevent or minimize this decrease in the working range, the weight percent of $Na_2O$+$K_2O$ in the glass can be increased and/or the weight percent of $SiO_2$+$Al_2O_3$ in the glass decreased as desired. It is anticipated that changes on the order of 0.05 to 0.1 weight percent in these components in the 9.9 to 10.5 weight percent CaO range would be effective to maintain a working range spanning more than 50° F. (28° C.).

PREDICTIVE EXAMPLE 2

Another glass composition was computer modeled as described above. The modeled glass was characterized as follows:

TABLE 7

| Component | Weight Percent |
|---|---|
| $SiO_2$ | 72.89 ± 0.1 |
| $Na_2O$ | 13.9 ± 0.1 |
| $K_2O$ | 0 |
| $Al_2O_3$ | 0.02 ± 0.01 |
| $SO_3$ | 0.2 ± .01 |
| $Fe_2O_3$ | 0.1 ± .01 |
| $SiO_2$ + $Al_2O_3$ | 72.91 ± 0.1 |
| $Na_2O$ + $K_2O$ | 13.9 ± 0.1 |
| CaO + MgO | 12.8 ± .11 |

Table 8 shows the computer modeling results for varying CaO and MgO for the above glass composition.

TABLE 8

| Wt. % CaO | Wt. % MgO | Melting Temp. | Forming Temp. | Bending Temp. | Annealing Temp. | Working Range (log 4–liquidus) |
|---|---|---|---|---|---|---|
| 9.01 | 3.79 | 2595° F. (1424° C.) | 1867° F. (1019° C.) | 1340° F. (727° C.) | 1015° F. (546° C.) | 65° F. (36° C.) |
| 9.11 | 3.69 | 2594° F. (1423° C.) | 1867° F. (1019° C.) | 1340° F. (727° C.) | 1015° F. (546° C.) | 64° F. (36° C.) |
| 9.20 | 3.59 | 2592° F. (1422° C.) | 1866° F. (1019° C.) | 1340° F. (727° C.) | 1015° F. (546° C.) | 64° F. (36° C.) |
| 9.40 | 3.39 | 2589° F. (1421° C.) | 1865° F. (1018° C.) | 1340° F. (727° C.) | 1016° F. (547° C.) | 61° F. (34° C.) |
| 9.50 | 3.29 | 2588° F. (1420° C.) | 1864° F. (1018° C.) | 1340° F. (727° C.) | 1016° F. (547° C.) | 60° F. (33° C.) |
| 9.60 | 3.19 | 2586° F. (1419° C.) | 1864° F. (1018° C.) | 1340° F. (727° C.) | 1017° F. (547° C.) | 58° F. (32° C.) |
| 9.70 | 3.09 | 2585° F. | 1863° F. | 1340° F. | 1017° F. | 57° F. |

TABLE 8-continued

| Wt. % CaO | Wt. % MgO | Melting Temp. | Forming Temp. | Bending Temp. | Annealing Temp. | Working Range (log 4–liquidus) |
|---|---|---|---|---|---|---|
| | | (1418° C.) | (1017° C.) | (727° C.) | (547° C.) | (32° C.) |
| 9.80 | 2.99 | 2584° F. | 1862° F. | 1340° F. | 1017° F. | 55° F. |
| | | (1418° C.) | (1017° C.) | (727° C.) | (547° C.) | (31° C.) |
| 10.00 | 2.79 | 2581° F. | 1861° F. | 1341° F. | 1018° F. | 51° F. |
| | | (1416° C.) | (1016° C.) | (727° C.) | (548° C.) | (31° C.) |
| 10.10 | 2.69 | 2579° F. | 1861° F. | 1341° F. | 1019° F. | 48° F. |
| | | (1415° C.) | (1016° C.) | (727° C.) | (548° C.) | (27° C.) |
| 10.20 | 2.59 | 2579° F. | 1860° F. | 1341° F. | 1020° F. | 47° F. |
| | | (1415° C.) | (1016° C.) | (727° C.) | (549° C.) | (27° C.) |
| 10.30 | 2.49 | 2578° F. | 1860° F. | 1340° F. | 1020° F. | 46° F. |
| | | (1414° C.) | (1016° C.) | (727° C.) | (549° C.) | (26° C.) |
| 10.40 | 2.39 | 2577° F. | 1859° F. | 1340° F. | 1021° F. | 46° F. |
| | | (1414° C.) | (1015° C.) | (727° C.) | (549° C.) | (25° C.) |
| 10.50 | 2.29 | 2576° F. | 1859° F. | 1340° F. | 1021° F. | 44° F. |
| | | (1413° C.) | (1015° C.) | (727° C.) | (549° C.) | (29° C.) |
| 10.60 | 2.19 | 2573° F. | 1858° F. | 1341° F. | 1022° F. | 36° F. |
| | | (1412° C.) | (1014° C.) | (727° C.) | (550° C.) | (20° C.) |

As shown in Table 8, increasing the weight percent of CaO from 9.01 to 10.60 in the glass while simultaneously decreasing the weight percent of MgO by substantially the same amount decreases the melting temperature of the glass about 22° F. (12° C.) and the forming temperature about 9° F. (5° C.) while the bending temperature of the glass changes only 1° F. (0.5° C.) and the annealing temperature changes only 7° F. (4° C.).

As discussed above, the weight percent of $Na_2O+K_2O$ can be increased and/or the weight percent of $SiO_2+Al_2O_3$ decreased as desired to adjust the working range to be greater than 50° F. (28° C.), if desired.

PREDICTIVE EXAMPLE 3

Another glass composition was computer modeled as described above. The modeled glass composition had the following components:

TABLE 9

| Component | Weight Percent |
|---|---|
| $SiO_2$ | 72.80 |
| $Na_2O$ | 13.90 |
| $K_2O$ | 0.03 |
| $Fe_2O_3$ | 0.10 |
| CaO + MgO | 12.74 |

The results of the computer modeling are shown graphically in FIG. 1, with the change in the parameters presented as normalized deviations with reference to a baseline value (0 value). The "0 values" for the presented parameters were:

| melting temperature | 2600° F. (1427° C.) |
| forming temperature | 1868° F. (1020° C.) |
| bending temperature | 1344° F. (729° C.) |
| annealing temperature | 1013° F. (545° C.) |
| working range | 81° F. (45° C.) |
| liquidus temperature | 1787° F. (975° C.) |
| strain point | 943° F. (506° C.) |

As shown in FIG. 1, while the melting temperature of the glass drops significantly as the relative amount of CaO increases, the bending and annealing temperatures of the glass remain substantially unchanged.

PREDICTIVE EXAMPLE 4

A further glass composition was modeled having the following composition:

TABLE 10

| Component | Weight Percent |
|---|---|
| $SiO_2$ | 72.41 |
| $Na_2O$ | 13.78 |
| $Al_2O_3$ | 0.16 |
| $Fe_2O_3$ | 0.48 |
| CaO + MgO | 12.84 |

Figure 2:
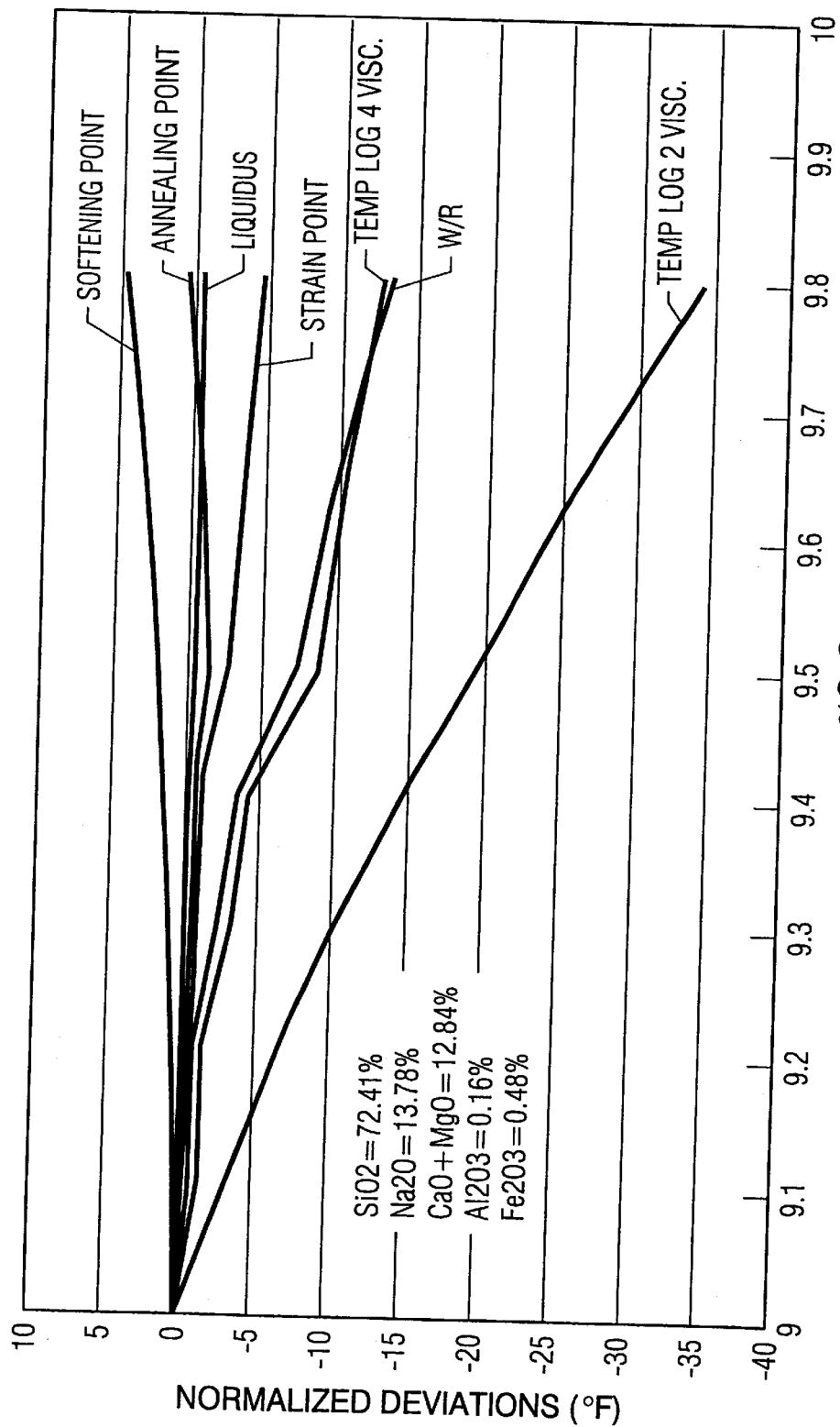
FIG. 2 is a graph of the normalized deviation of selected parameters versus weight percent CaO for another exemplary (computer modeled) glass composition of the invention.

The results of the computer modeling are presented graphically in FIG. 2 as normalized deviations from a 0 value in similar manner to FIG. 1. The "0 values" for the various parameters were:

| melting temperature | 2619° F. (1437°C.) |
| forming temperature | 1870° F. (1021°C.) |
| bending temperature | 1335° F. (724°C.) |
| annealing temperature | 1015° F. (546°C.) |
| working range | 61° F. (34° C.) |
| liquidus temperature | 1809° F. (987°C.) |
| strain point | 946° F. (508° C.) |

EXAMPLE 5

In addition to the computer modeling described above, the invention was tested to determine the effect of the practice of the invention on the thermal efficiency of a conventional glass melter. As used herein, the term "thermal efficiency" means the theoretical amount of fuel required to melt a given amount of glass batch materials (assuming 2.5 million BTU to melt 1 ton of batch materials and 1.7 million BTU to melt 1 ton of cullet) divided by the actual amount of fuel used. The term "% thermal efficiency" is the thermal efficiency multiplied by 100. The glass composition tested was characterized by:

TABLE 11

| Component | Weight Percent |
|---|---|
| $SiO_2$ | 72.56 |
| $Na_2O + K_2O$ | 13.85 |
| $Fe_2O_3$ | 0.49 |
| $CaO + MgO$ | 12.89 |

Figure 3:
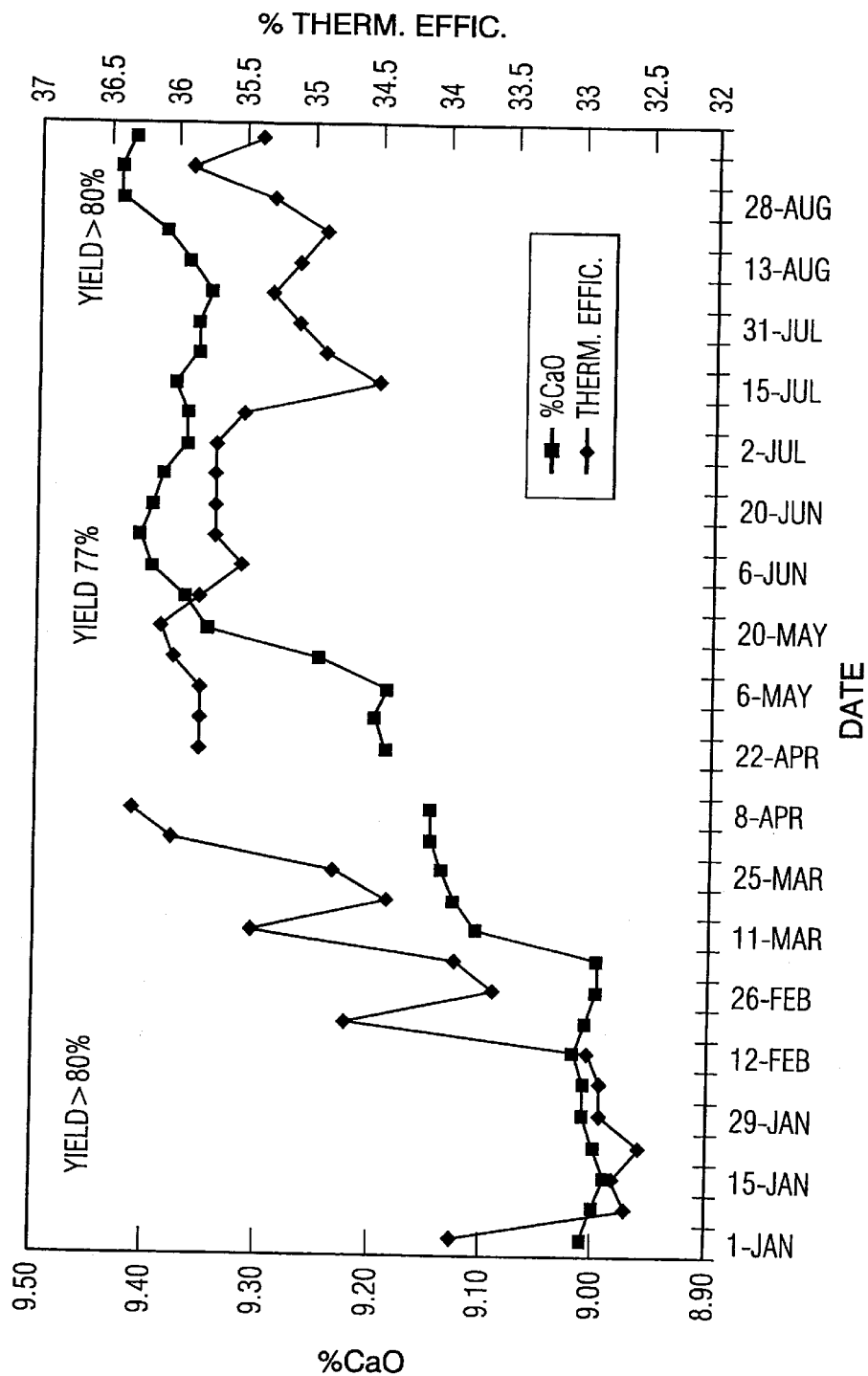
FIG. 3 is a graph of thermal efficiency versus weight percent CaO used for an eight month time period in which a glass making furnace was operated in accordance to the features of the invention.

Batch materials to form this glass composition were melted in a glass furnace and FIG. 3 shows the variation in thermal efficiency as the amounts of the batch materials were adjusted so that the relative amount (weight percent) of CaO in the glass composition was increased while simultaneously decreasing the MgO in the glass composition by the same amount (weight percent). The thermal efficiency generally increased from about 32.5% to about 35% as the weight percent CaO increased from about 9.0% to about 9.4%.

Table 12 presents actual and predictive glass compositions which show a reduced amount of MgO and an increased amount of one or more of CaO, $R_2O$, $Al_2O_3$, $SiO_2$ resulting in a reduced liquidus temperature.

TABLE 12

COMPOSITIONS AND THEIR PHYSICAL PROPERTIES

| % Oxide | Example 6 | Example 7 | Example 8 | Example 9 | Example 10 | Example 11 | Example 12 |
|---|---|---|---|---|---|---|---|
| $SiO_2$ | 69.52 | 71.78 | 72.00 | 72.20 | 72.29 | 71.93 | 72.10 |
| $Na_2O$ | 14.82 | 14.20 | 14.22 | 14.45 | 14.18 | 14.02 | 14.31 |
| $K_2O$ | 0.35 | 0.40 | 0.40 | 0.40 | 0.34 | 0.39 | 0.39 |
| CaO | 10.54 | 9.39 | 9.43 | 9.43 | 9.41 | 9.29 | 9.36 |
| MgO | 1.94 | 1.37 | 1.37 | 1.14 | 1.43 | 2.11 | 1.45 |
| $Al_2O_3$ | 2.01 | 2.06 | 1.79 | 1.63 | 1.54 | 1.54 | 1.63 |
| $SO_3$ | 0.28 | 0.23 | 0.23 | 0.23 | 0.23 | 0.20 | 0.16 |
| $Fe_2O_3$ | 0.50 | 0.51 | 0.51 | 0.52 | 0.53 | 0.52 | 0.52 |
| SUM | 99.95 | 99.94 | 99.95 | 99.99 | 99.95 | 100.00 | 99.92 |
| $R_2O/Al_2O_3$ | 7.55 | 7.09 | 8.17 | 9.11 | 9.43 | 9.36 | 9.02 |
| $RO/Al_2O_3$ | 6.21 | 8.24 | 6.03 | 6.48 | 7.04 | 7.40 | 6.63 |
| CaO/MgO | 5.43 | 6.85 | 6.88 | 8.27 | 6.58 | 4.40 | 6.46 |
| CaO + MgO | 12.48 | 10.76 | 10.80 | 10.57 | 10.84 | 11.40 | 10.81 |
| $SiO_2/Al_2O_3$ | 34.59 | 34.84 | 40.22 | 44.29 | 46.94 | 46.71 | 44.23 |
| $SiO_2 + Al_2O_3$ | 71.53 | 73.84 | 73.79 | 73.83 | 73.83 | 73.47 | 73.73 |
| $CaO + R_2O + Al_2O_3$ | 27.72 | 26.05 | 25.84 | 25.91 | 25.47 | 25.24 | 25.69 |
| $CaO + R_2O + Al_2O_3/MgO$ | 14.28 | 19.01 | 18.86 | 22.73 | 17.81 | 11.96 | 17.72 |
| Log 2 (° F./° C.) | 2536/1391 | 2640/1449 | 2631/1444 | 2624/1440 | 2615/1435 | 2621/1438 | 2627/1442 |
| Log 3.5 (° F./° C.) | 1963/1073 | 2021/1105 | 2008/1098 | 2005/1096 | 2003/1095 | 2012/1100 | 2004/1096 |
| Log 4 (° F./° C.) | 1834/1001 | 1884/1029 | 1873/1023 | 1872/1022 | 1870/1021 | 1869/1021 | |
| Log 7.6 (Softening Pt. ° F.) | 1323 | 1334 | 1335 | 1332 | 1337 | 1343 | 1335 |
| Liquidus (° F.) | 1843 | 1805 | 1801 | 1796 | 1803 | 1815 | 1797 |
| Working Range 1 (° F./° C.) | 120/49 | 216/102 | 207/97 | 209/98 | 200/93 | 197/92 | 207/97 |
| Working Range 2 (° F./° C.) | −9/−23 | 79/26 | 72/22 | 76/24 | 67/19 | 54/12 | |

| % Oxide | Example 13 | Example 14 | Example 15 | Example 16 | Example 17 | Example 18 | Example 19 |
|---|---|---|---|---|---|---|---|
| $SiO_2$ | 71.71 | 71.81 | 71.90 | 72.00 | 70.20 | 70.42 | 70.37 |
| $Na_2O$ | 13.73 | 13.87 | 14.02 | 14.16 | 14.02 | 13.79 | 13.94 |
| $K_2O$ | 0.39 | 0.39 | 0.39 | 0.39 | 0.536 | 0.543 | 0.515 |
| CaO | 9.09 | 9.16 | 9.22 | 9.29 | 9.86 | 9.87 | 9.93 |
| MgO | 2.70 | 2.39 | 2.07 | 1.76 | 2.20 | 2.20 | 2.20 |
| $Al_2O_3$ | 1.63 | 1.63 | 1.63 | 1.63 | 2.39 | 2.40 | 2.25 |
| $SO_3$ | 0.16 | 0.16 | 0.16 | 0.16 | 0.227 | 0.219 | 0.233 |
| $Fe_2O_3$ | 0.52 | 0.52 | 0.52 | 0.52 | 0.496 | 0.500 | 0.498 |
| SUM | 99.93 | 99.93 | 99.91 | 99.91 | 99.929 | 99.942 | 99.936 |
| $R_2O/Al_2O_3$ | 8.66 | 8.75 | 8.84 | 8.93 | 6.09 | 5.97 | 6.42 |
| $RO/Al_2O_3$ | 7.23 | 7.09 | 6.93 | 6.78 | 5.05 | 5.03 | 5.39 |
| CaO/MgO | 3.37 | 3.83 | 4.45 | 5.28 | 4.48 | 4.49 | 4.51 |
| CaO + MgO | 11.79 | 11.55 | 11.29 | 11.05 | 12.06 | 12.07 | 12.13 |
| $SiO_2/Al_2O_3$ | 43.99 | 43.99 | 44.11 | 44.17 | 29.37 | 29.34 | 31.28 |
| $SiO_2 + Al_2O_3$ | 73.34 | 73.44 | 73.53 | 73.63 | 72.59 | 72.82 | 72.62 |
| $CaO + R_2O + Al_2O_3$ | 24.84 | 25.05 | 25.26 | 25.47 | 26.806 | 26.603 | 26.635 |
| $CaO + R_2O + Al_2O_3/MgO$ | 9.20 | 10.48 | 12.20 | 14.47 | 12.18 | 12.09 | 12.11 |
| $CaO + R_2O + Al_2O_3/MgO$ | 8.48 | 15.60 | 284.27 | 323.60 | 296.17 | 265.85 | 261.35 |
| Log 2 (° F./° C.) | 2637/1447 | 2635/1446 | 2632/1444 | 2629/1443 | | | |
| Log 3.5 (° F./° C.) | 2021/1105 | 2017/1103 | 2012/1100 | 2008/1098 | | | |
| Log 4 (° F./° C.) | | | | | | | |
| Log 7.6 (Softening Pt. ° F.) | 1342 | 1340 | 1338 | 1337 | | | |
| Liquidus (° F.) | 1822 | 1815 | 1808 | 1802 | | | |
| Working Range 1 (° F./° C.) | 199/93 | 202/94 | 204/96 | 206/97 | | | |
| Working Range 2 (° F./° C.) | | | | | | | |

TABLE 12-continued

COMPOSITIONS AND THEIR PHYSICAL PROPERTIES

| % Oxide | Example 20 | Example 21 | Example 22 | Example 23 | Example 24 | Example 25 | Example 26 |
|---|---|---|---|---|---|---|---|
| $SiO_2$ | 71.01 | 71.96 | 73.97 | 73.41 | 72.89 | 72.94 | 73.39 |
| $NA_2O$ | 13.58 | 13.94 | 16.07 | 15.60 | 16.10 | 15.58 | 15.11 |
| $K_2O$ | 0.39 | 0.38 | 0.014 | 0.014 | 0.015 | 0.015 | 0.015 |
| CaO | 9.13 | 9.25 | 9.47 | 10.48 | 10.52 | 10.96 | 10.99 |
| MgO | 2.92 | 1.61 | 0.09 | 0.09 | 0.09 | 0.10 | 0.10 |
| $Al_2O_3$ | 1.67 | 1.55 | 0.03 | 0.03 | 0.02 | 0.03 | 0.02 |
| $SO_3$ | 0.20 | 0.21 | 0.126 | 0.128 | 0.130 | 0.131 | 0.123 |
| $Fe_2O_3$ | 0.79 | 0.80 | 0.009 | 0.007 | 0.006 | 0.007 | 0.006 |
| SUM | 99.69 | 99.70 | 99.779 | 99.759 | 99.771 | 99.763 | 99.754 |
| $R_2O/Al_2O_3$ | 8.37 | 9.24 | 536.13 | 520.47 | 805.75 | 519.83 | 756.25 |
| $RO/Al_2O_3$ | 10.44 | 7.01 | 318.67 | 352.33 | 530.50 | 368.67 | 554.50 |
| CaO/MgO | 3.13 | 5.74 | 105.22 | 116.44 | 116.89 | 109.60 | 109.90 |
| CaO + MgO | 12.05 | 10.86 | 9.56 | 10.57 | 10.61 | 11.06 | 11.09 |
| $SiO_2/Al_2O_3$ | 42.52 | 46.43 | 2465.67 | 2447.00 | 3644.50 | 2431.33 | 3669.50 |
| $SiO_2 + Al_2O_3$ | 72.68 | 73.51 | 74.00 | 73.44 | 72.91 | 79.97 | 73.41 |
| $CaO + R_2O + Al_2O_3$ | 24.77 | 25.12 | 25.584 | 26.124 | 26.655 | 26.585 | 26.135 |
| Log 2 (° F./° C.) | 2595/1424 | 2599/1426 | 2568/1409 | 2557/1403 | 2516/1380 | 2521/1383 | 2534/1390 |
| Log 3.5 (° F./° C.) | 2003/1095 | 1998/1092 | 1953/1067 | 1956/1069 | 1931/1055 | 1935/1057 | 1936/1058 |
| Log 4 (° F./° C.) | | | 1819/993 | 1827/997 | 1805/985 | 1809/987 | 1809/987 |
| Log 7.6 (Softening Pt. ° F.) | 1338 | 1332 | | | | | |
| Liquidus (° F.) | 1845 | 1794 | 1796 | 1789 | 1789 | 1805 | 1810 |
| Working Range 1 (° F./° C.) | | | 23/-5 | 38/3 | 16/-9 | 4/-16 | -1/-18 |
| Working Range 2 (° F./° C.) | | | 157/69 | 167/75 | 142/61 | 130/54 | 126/52 |

Note: Measured viscosity and liquidus values are +/-2° F. (-17° C.) except for softening point which is +/-1° F. (-17° C.)
Comments: Example 6 has the lowest melting viscosity (MV), but the liquidus is 14° F. higher and the SP is 21° F. lower than standard. Example 9 has the lowest liquidus, but the softening point (SP) is on the low side and the MP is only 16° F. less than standard. Example 10 has a 26° F. lower liquidus, and 25° F. lower MV, and a 7° F. lower SP which is only 2–4° F. higher than Standard is Log 2 of 2640° F., Log 3.5 of 2021, Log 4 of 1886, Log 7.6 of 1344 and liquidus of 1829° F. $R_2O$ = alkali oxides of $Na_2O$ and $K_2O$ RO = alkaline earth metal oxides of CoO and MgO

What is claimed is:

1. A glass composition, comprising:

| | |
|---|---|
| $SiO_2$ | 70 to 75 weight percent |
| $Na_2O$ | 12 to 15 weight percent |
| $K_2O$ | 0 to 5 weight percent |
| CaO | >9 weight percent |
| MgO | <4 weight percent |
| $Al_2O_3$ | 0.01 to 4 weight percent |
| $SO_3$ | 0 to 1 weight percent |
| $Fe_2O_3$ | 0 to 2 weight percent |
| wherein: | |
| $SiO_2 + Al_2O_3$ | ≧70 weight percent |
| $Na_2O + K_2O$ | 12–17 |
| CaO + MgO | 9–less than 13.4 |
| $CaO + R_2O + Al_2O_3$ | 23–29 | wherein the glass composition provides a melting temperature in the range of about 2510° F. to about 2650° F. (1376° C. to 1454° C.), a forming temperature in the range of about 1800° F. to 1894° F. (982° C. to 1034° C.), and a liquidus temperature in the range of about 1780° F. to 1850° F. (971° C. to 1010° C.).

2. A glass composition, comprising:

| | |
|---|---|
| $SiO_2$ | 70 to 75 weight percent |
| $Na_2O$ | 12 to 15 weight percent |
| $K_2O$ | 0 to 5 weight percent |
| CaO | >9 weight percent |
| MgO | 1 to 3 weight percent |
| $Al_2O_3$ | 0.01 to 4 weight percent |
| $SO_3$ | 0 to 1 weight percent |
| $Fe_2O_3$ | At least 0.1 to 2 weight percent |
| wherein: | |
| $SiO_2 + Al_2O_3$ | ≧70 weight percent |
| $Na_2O + K_2O$ | 12–17 |
| CaO + MgO | 9–14 |
| $CaO + R_2O + Al_2O_3$ | 23–29 | wherein for high iron the glass composition provides a melting temperature in the range of about 2510° F. to about 2650° F. (1376° C. to 1454° C.), a forming temperature in the range of about 1800° F. to 1894° F. (982° C. to 1034° C.), and a liquidus temperature in the range of about 1780° F. to 1850° F. (971° C. to 1010° C.).

3. A glass composition of claim 1, wherein the amount of MgO is in the range of 0.01 to 0.15 for low iron glasses and the glass has a liquidus temperature in the range of 1790° F. to 1820° F. (976° C. to 994° C.).

4. A glass composition of claim 1, wherein the liquidus temperature in the range of about 1789° F. to 1845° F. (976° C. to 1007° C.).

5. A glass composition of claim 1, wherein the amount of $CaO+R_2O+Al_2O_3$ is in the range from 24 to 28 weight percent.

6. The composition according to claim 1, wherein CaO is in the range of greater than 9 to 12 weight percent.

7. The composition according to claim 1, wherein CaO+MgO is in the range of 10 to 13.5 weight percent.

8. A glass composition of claim 2, wherein the liquidus temperature in the range of about 1789° F. to 1845° F. (976° C. to 1007° C.).

9. A glass composition of claim 2, wherein the amount of $CaO+R_2O+Al_2O_3$ is in the range from 24 to 28 weight percent.

10. The composition according to claim 2, wherein CaO is in the range of greater than 9 to 12 weight percent.

11. The composition according to claim 2, wherein GaO+MgO is in the range of 10 to 13.5 weight percent.

12. The composition according to claim 1, wherein the glass is a basic soda-lime-silica glass composition formed by melting a batch having silica (sand), soda ash (a carbonate of soda), dolomite (a carbonate of calcium and magnesium), limestone (a carbonate of calcium), and oxidizing agents, such as nitrate or sulfate, wherein the limestone and dolomite act as fluxes to aid in dissolution of the silica and to improve the durability of the glass product.

13. The composition according to claim 1, wherein having a lower temperature of melting, forming, or liquidus without substantially changing the bending and annealing temperatures of the glass composition through any decrease in the amount of MgO in the glass composition is accompanied by an increase in the amount of two or more or all of CaO, $R_2O$ ($Na_2O$ and $K_2O$), $Al_2O_3$ and $SiO_2$ by the same or about the same amount.

* * * * *